(12) United States Patent
Caracuel et al.

(10) Patent No.: US 9,042,541 B2
(45) Date of Patent: May 26, 2015

(54) MULTI-NODE PREDICTIVE DIALING FOR SCALABILITY

(71) Applicants: Manuel Caracuel, Parkland, FL (US); Girish Puthanveedu Nair, Saint Charles, IL (US)

(72) Inventors: Manuel Caracuel, Parkland, FL (US); Girish Puthanveedu Nair, Saint Charles, IL (US)

(73) Assignee: Unify GmbH & Co. KG, Munich (DE)

( * ) Notice: Subject to any disclaimer, the term of this patent is extended or adjusted under 35 U.S.C. 154(b) by 64 days.

(21) Appl. No.: 13/852,156

(22) Filed: Mar. 28, 2013

(65) Prior Publication Data

US 2014/0294171 A1 Oct. 2, 2014

(51) Int. Cl.
 *H04M 3/00* (2006.01)
 *H04M 3/523* (2006.01)
 *H04M 3/51* (2006.01)
 *H04M 7/00* (2006.01)

(52) U.S. Cl.
 CPC .......... *H04M 3/5232* (2013.01); *H04M 3/5158* (2013.01); *H04M 7/006* (2013.01)

(58) Field of Classification Search
 CPC ............ H04M 3/5232; H04M 3/5191; H04M 3/5233; H04M 3/5166; H04M 3/5183; H04M 3/5158; H04M 3/51; H04M 3/523
 USPC .............. 379/265.11, 266.07–266.08, 265.02
 See application file for complete search history.

(56) References Cited

U.S. PATENT DOCUMENTS

| | | | |
|---|---|---|---|
| 6,282,282 B1 | 8/2001 | Wineberg et al. | |
| 6,449,358 B1 | 9/2002 | Anisimov et al. | |
| 6,771,765 B1 * | 8/2004 | Crowther et al. | 379/265.09 |
| 6,775,378 B1 * | 8/2004 | Villena et al. | 379/266.07 |
| 7,656,866 B2 | 2/2010 | Banner et al. | |
| 8,238,543 B2 | 8/2012 | Shashkov et al. | |
| 2006/0188086 A1 * | 8/2006 | Busey et al. | 379/265.09 |
| 2008/0118050 A1 | 5/2008 | Rodenbusch et al. | |
| 2008/0317238 A1 | 12/2008 | Cai et al. | |
| 2011/0051918 A1 * | 3/2011 | Fan et al. | 379/211.02 |

FOREIGN PATENT DOCUMENTS

| | | |
|---|---|---|
| EP | 1246440 A1 | 10/2002 |
| EP | 1643743 A1 | 4/2006 |

OTHER PUBLICATIONS

The session Initiation Protocol (SIP) Refer Method by R. Sparks, Apr. 2003, http://www.ietf.org/rfc/rfc3515.txt.
SIP: Session Initiation Protocol by J. Rosenberg, H. Schulzrinne, G. Camarillo, A. Johnston, J. Peterson, R. Sparks, M. Handley and E. Schooler, Jun. 2002, http://www.ietf.org/rfc/rfc3261.txt.
SDP: Session Description Protocol by M. Handley and V. Jacobson, Apr. 1998, http://www.ietf.org/rfc/rfc2327.txt.
Uniform Resource Identifiers (URI): Generic Syntax by T. Berners-Lee, R. Fielding, U.C. Irvine and L. Masinter, Aug. 1998, http://www.ietf.org/rfc/rfc2396.txt.
Intellectual Property Office Search Report of GB1403112.4 dated Jul. 31, 2014.

* cited by examiner

*Primary Examiner* — Rasha Al Aubaidi
(74) *Attorney, Agent, or Firm* — Buchanan Ingersoll & Rooney PC

(57) ABSTRACT

Multiple-nodes (multiple media servers) can be deployed in a single outbound calling system. Agent nailups can be established with the media servers, on a one-to-one basis (an agent is nailed up to only one of the media servers at any given time). Predictive dialing can be performed by each of the media servers (dialing nodes), resulting in active (answered) calls with customers. If the active call is in a different node than a nailup for an available agent, the controller can direct the agent nailup to be moved to the node which is handling the active call (or call leg).

20 Claims, 2 Drawing Sheets

MULTI-NODE PREDICTIVE DIALING FOR SCALABILITY

TECHNICAL FIELD

The invention relates to telecommunications, more particularly to a method of operating an outbound calling system, such as a system using predictive dialing to call customers and connecting answered calls with available agents. The invention further relates to a computer program product for executing such a method and to a system implementing the method.

BACKGROUND

A telecommunications network generally includes a collection of terminals, links and nodes which connect together to enable telecommunication between users of the terminals. Examples of telecommunications networks are: computer networks, the Internet, the telephone network, and others. Messages are generated by a sending terminal, then pass through the network of links and nodes until they arrive at the destination terminal. It is the job of the intermediate nodes to handle the messages and route them down the correct link toward their final destination. The messages consist of control (or signaling) and media parts which can be sent together or separately. The control (or signaling) part instructs the nodes where and possibly how the message should be routed through the network. The media is the actual content that the user wishes to transmit (e.g. some encoded speech, or an e-mail).

A typical Voice over Internet Protocol (VoIP) network may comprise of one or more application servers, one or more centralized media servers, one or more media gateways, and a plurality of VoIP endpoints. The application server provides call processing within the VoIP network. The media server includes media resources that are adapted to provide value-added services for calls in the VoIP network, such as playing announcements, compression/decompression (CODEC) conversion, DTMF digit collection, conferencing, ringback tones, advertising, etc. The media gateway is adapted to interface the VoIP network with a public switched telephone network (PSTN). The VoIP endpoints are network elements used to originate or terminate a call over the VoIP network, such as a VoIP phone, a PDA, a computer having VoIP capabilities, etc.

A number of protocols have been developed over the years to specify how each different type of telecommunication network should handle the control and media parts to achieve this efficiently. One such protocol is Session Initiation Protocol (SIP), an Internet Protocol (IP) telephony text-based signaling protocol suitable for integrated voice/data applications, including VoIP services. Each resource of a SIP network, such as a user agent or a voicemail box, is identified by a uniform resource identifier (URI). SIP is primarily used in setting up and tearing down voice or video calls. It also allows modification of existing calls. The modification can involve changing addresses or ports, inviting more participants, and adding or deleting media streams.

Some SIP Commands and Other Terminology

Some SIP commands and other terminology that may be used herein may include:

Call
  A call is an informal term that refers to some communication between peers, generally set up for the purposes of a multimedia conversation.

Call Leg
  Another name for a dialog; no longer used in the SIP specification.

Client
  A client is any network element that sends SIP requests and receives SIP responses. Clients may or may not interact directly with a human user. User agent clients and proxies are clients.

Conference
  A multimedia session (see below) that contains multiple participants.

Inter-Process Communication (IPC)
  Inter-Process Communication is any method used to communicate between different processes, such as remote procedure calls.

Invitation
  An INVITE request.

INVITEe, INVITEd User, Called party, Callee
  The party that receives an INVITE request for the purpose of establishing a new session. A callee retains this role from the time it receives the INVITE until the termination of the dialog established by that INVITE.

Message
  Data sent between SIP elements as part of the protocol. SIP messages are either requests or responses.

Redirect Server
  A redirect server is a user agent server that generates 3xx responses to requests it receives, directing the client to contact an alternate set of URIs.

REFER
  From RFC 3515: REFER is a SIP method as defined by RFC 3261. The REFER method indicates that the recipient identified by the Request-URI should contact a third party using the contact information provided in the request.

Request
  A SIP message sent from a client to a server, for the purpose of invoking a particular operation.

Server
  A server is a network element that receives requests in order to service them and sends back responses to those requests. Examples of servers are proxies, user agent servers, redirect servers, and registrars.

Session
  From the SDP (Session Description Protocol) specification: "A multimedia session is a set of multimedia senders and receivers and the data streams flowing from senders to receivers. A multimedia conference is an example of a multimedia session." (RFC 2327 (A session as defined for SDP can comprise one or more RTP sessions.) As defined, a callee can be INVITEd several times, by different calls, to the same session. If SDP is used, a session is defined by the concatenation of the SDP user name, session id, network type, address type, and address elements in the origin field.

SIP Transaction
  A SIP transaction occurs between a client and a server and comprises all messages from the first request sent from the client to the server up to a final (non-1xx) response sent from the server to the client. If the request is INVITE and the final response is a non-2xx, the transaction also includes an ACK to the response. The ACK for a 2xx response to an INVITE request is a separate transaction.

URI (Uniform Resource Identifier) [RFC 2396]
  A string of characters for identifying all types of names and addresses on the Internet (e.g., a page of text, a video, a program, a SIP proxy). It enables a XXXXXX to interact with the resource over a network (typically the Internet) using specific protocols. Schemes specifying a concrete syntax and associated protocols define each URI.

User Agent Server (UAS)

A user agent server is a logical entity that generates a response to a SIP request. The response accepts, rejects, or redirects the request. This role lasts only for the duration of that transaction. In other words, if a piece of software responds to a request, it acts as a UAS for the duration of that transaction. If it generates a request later, it assumes the role of a user agent client for the processing of that transaction.

User Agent (UA)

A logical entity that can act as both a user agent client and user agent server.

Media Servers

Media Servers are automated call processing servers in a VoIP system. A Media Server (MS) acts as the end point for a SIP call and typically plays pre-recorded voice announcements and prompts, accepts DTMF key presses or spoken instructions to allow it to implement interactive services such as voicemail, tele-banking, tele-voting etc.

U.S. Pat. No. 7,656,866 B2, incorporated by reference herein, discloses methods of controlling media server resources in a VoIP network, and a media server resource broker that tracks assignment levels of a plurality of media servers. This technology is similar in that like in embodiments of the present invention it is a system that uses an application server and several media servers to provide services. However, unlike in embodiments of the present invention, requests for services come from IP Nodes. In embodiments of the present invention, there are no such requests, the application server itself selects a media server to initiate a SIP call and then can move an agent's call in order to conference the two parties within a single media server node. The system described in U.S. Pat. No. 7,656,866 B2 does not have the need for the method according to embodiments of the present invention because it does not address a predictive outbound dialing system. Embodiments of the present invention solve a problem that is only present when doing predictive outbound dialing in a system with multiple media servers.

US 2008/0317238 A1, incorporated by reference herein, discloses distributed media resources in VoIP networks for providing services. A distributed resource server is adapted to monitor the status of the available media resources of the VoIP endpoints and to transmit configuration parameters to the VoIP endpoints to configure the available media resources of the VoIP endpoints to provide the services for calls in the VoIP network. Embodiments of the present invention use multiple media servers and as such some mechanism to choose how to distribute the load amongst the media servers is needed. However, embodiments of the present invention do not specify any particular method to do that.

U.S. Pat. No. 8,238,543 B2, incorporated by reference herein, discloses a system for making outbound calls which includes a first node connected to a network for placing outbound telephone calls, a second node connected to the network and accessible to the first node for reporting agent status relative to busy, ready, and time to ready, a number of agent appliances connected to the network and accessible to the second node, and a number of agent activity applications installed one per on the agent appliances. In a preferred embodiment outbound calls are predicted based on the number of agents reported ready to accept a call plus the number of agents predicted to be ready to accept a call within a specified time window.

U.S. Pat. No. 6,449,358 B1, incorporated by reference herein, discloses a system for balancing outbound dialing rate with agent utilization in a telephony call center, minimizing wait time for answered outdialed calls which has a call number generating module for generating numbers to be automatically dialed, a dialing unit for dialing numbers generated, a queue for queing answered calls, and a stat module for monitoring performance and generating a call generation rate. The system uses an analytical method in one embodiment for determining the call generation rate, wherein the method uses one or more of distribution function of system processes, numerical methods, solving of non-linear equations, or probability techniques. In another embodiment the system accomplishes the same purpose using a simulation method for determining the call generation rate, wherein parameters relating to a queing system are estimated in absence of sufficient information by simulating each of the system's processes, predicting behavior of the system on basis of previous experience, and finding optimal point in future to make a next call.

U.S. Pat. No. 6,282,282 B1, incorporated by reference herein, discloses an inbound/outbound balancing system which transfers agents based on a predicted future inbound average call waiting time. The future average call waiting time is predicted to be the then sampled average call waiting time times the slope (i.e. rate of change) in average call waiting time between the current sample and the next previous sample. Based upon the predicted call waiting time, a determination is made whether or not agents should be added or deleted to maintain the inbound performance parameter within an acceptable range. The direction of change in call waiting time (i.e. increasing or decreasing); the rate at which it is changing, and the duration of the predicted average call waiting time relative to the boundaries of a range area are used to determine whether or not to reassign blend agents and if reassigned, how many to reassign.

Predictive Dialing

A predictive dialer is a computerized system that automatically dials batches of telephone numbers for connection to agents assigned to sales or other campaigns. Predictive dialers are widely used in call centers. A predictive dialer dials a list of "customer" telephone numbers, and connects answered dials to people who will be handling answered calls, often referred to as agents. Predictive dialers may use statistical algorithms to minimize the time that agents spend waiting between conversations, while minimizing the occurrence of someone answering when no agent is available. If an agent is not available within a short time period, such as 2 seconds, the call may be considered "abandoned" and an automated message may be played. Regulations in some countries may require that predictive dialers abandon less than 3% of answered calls on a daily basis.

Predictive dialing generally requires the system to perform the following basic steps:

1. dial a customer's phone number
2. analyze the signaling and the media of the call to determine a call result, such as whether the call is answered or not
3. for a positive call result (call is answered, and considered to be an "active call"), the system:
    a. finds an available agent
    b. routes the call to that agent's phone
    c. may send a screen pop to the agent's screen with information about the call One way of minimizing a delay between the time that a customer called by the outbound system answers the phone and the time that the call is connected by the system (routed to) an agent is to ensure that the answered call is routed to an agent that is already connected in the system. These processes may be referred to as "agent nailup".

A typical outbound system uses a media server (MS) and a controller. The controller instructs the media server to perform the steps of (step 1) dialing the customer numbers and (step 2) determining the call result. For a positive call result (step 3), the controller (step 3a) finds an available agent and instructs the media server to create a conference between the customer call leg and the agent nailup, in essence routing the call to the agent (step 3b). The controller may then also (step 3c) send a signal (screen pop) to the agent's desktop computer (or other display device) so that the called customer's information can be displayed to the agent assigned to the call.

FIG. 1 illustrates a single-node, predictive dialing system 100 comprising a controller 110 and a media server (MS) 120. The controller 110 directs the actions of the media server 120 such as by sending commands (using some IPC method) to the media server 120, and the media server 120 may send responses (also using IPC) back to the controller 110, as indicated by the line 112. The media server 120 constitutes a node in the system 100, and may be referred to as a "media server node", or simply as a "node".

An agent 130 who may be one of many agents using the system 100 (such as in a call center) is shown. A customer 140 who may be one of many customers who are called (dialed) by the system 100 is shown. The controller 110 may direct (command) the media server 120 to call a plurality of customers 140 using a predictive dialing scheme. The agent(s) 130 and the customer(s) 140 are, of course, not part of the system 100, but they interact with the system 100. The media server 120 may establish a nailup with an agent, as indicated by the line 132. The media server 120 may dial a customer, as indicated by the line 142.

In an exemplary use scenario, the media server 120 (and controller 110) may perform the following steps (shown by dashed lines):

(1) establish a nailup with an agent 130;
(2) dial a customer 140;
(3) analyze the result of the call (whether the call is answered by the customer 140);
(4) connect the agent 130 and the customer 140 in a conference; and
(5) the controller 110 may send a "screen pop" to the agent's screen, via the media server 120, with information (such as name, personal profile, demographic information, and the like) about the customer 140 with whom the agent 130 is connected.

A problem with the approach such as described above and illustrated in FIG. 1 is "scalability". An outbound calling system can typically only scale up to the maximum number of call legs (calls to customers, agent nailups) that a single media server (MS) can handle, which may be limited due to the processing requirements of signaling and media handling within the system. For example, a system may be limited to only 375 agents using G.729 (an ITU standard codec) channels, which means if a purchaser (user) of the system wants to purchase licenses for 500 agents, system's vendor would need to sell the purchaser two independent systems.

SUMMARY

It is an object of the invention to provide improved techniques for operating an outbound calling system, and more particularly to provide an outbound predictive dialing system that is scalable beyond the capacity of a single node system, thereby increasing the number of agents that can be supported by the system.

A solution to the scalability problem, generally, is to deploy multiple media servers in the system. A challenge with such an approach is that the customer's call and the agent nailup must be in the same media server.

According to embodiments of the invention, generally, multiple-nodes (i.e., multiple media servers) can be deployed in a single outbound calling system. Agent nailups can be established with the media servers, on a one-to-one basis (an agent is nailed up to only one of the media servers at any given time). Predictive dialing can be performed by each of the media servers (dialing nodes), resulting in active (answered) calls with customers. If the active call is in a different node than a nailup for an available agent, the controller can direct the agent nailup to be moved to the node which is handling the active call (or call leg).

A computer program product for executing the inventive method as outlined above may be provided. The computer program product may be a software product comprising instructions. The computer program product may be comprised by a machine readable medium wherein the machine readable medium may be a floppy disk, a CD (compact disc), a DVD (digital versatile disc), or any other suitable digital or analogue medium.

BRIEF DESCRIPTION OF THE DRAWINGS

Reference will be made in detail to embodiments of the disclosure, non-limiting examples of which may be illustrated in the accompanying drawing figures (FIGs). The figures are generally in the form of diagrams. Some elements in the figures may be exaggerated, others may be omitted, for illustrative clarity. Some figures may be in the form of diagrams. Although the invention is generally described in the context of various exemplary embodiments, it should be understood that it is not intended to limit the invention to these particular embodiments, and individual features of various embodiments may be combined with one another. Any text (legends, notes, reference numerals and the like) appearing on the drawings are incorporated by reference herein.

Figure 1:
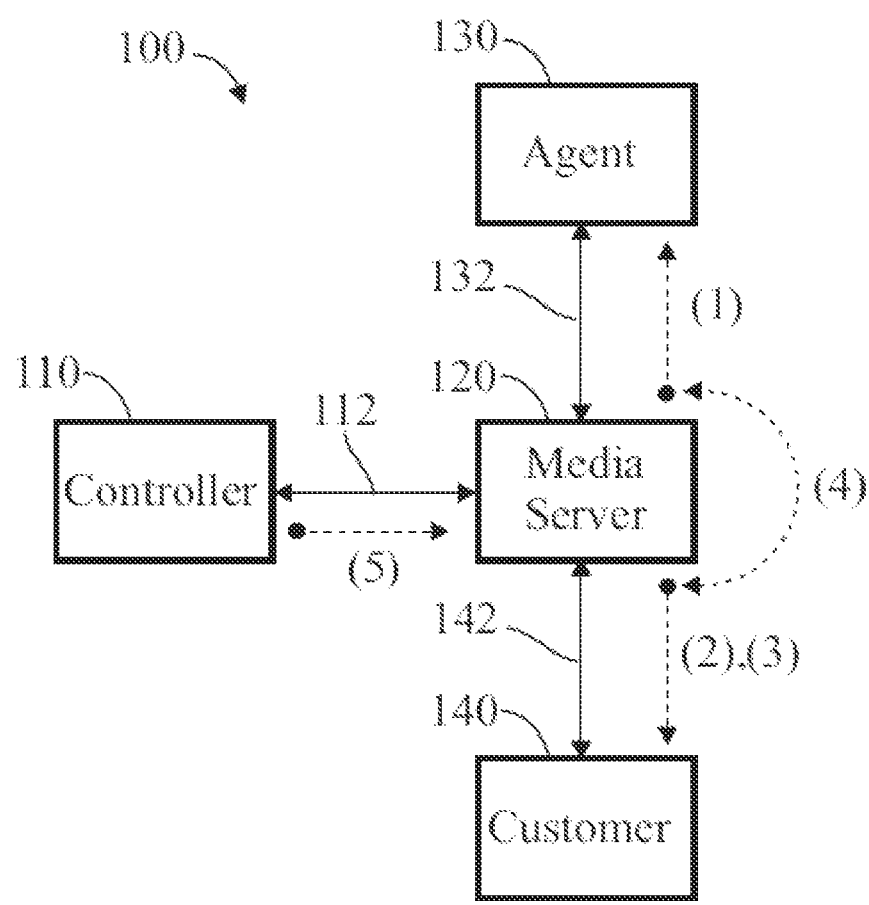
FIG. 1 is a diagram illustrating an exemplary embodiment of a single-node predictive dialing system.
Figure 2:
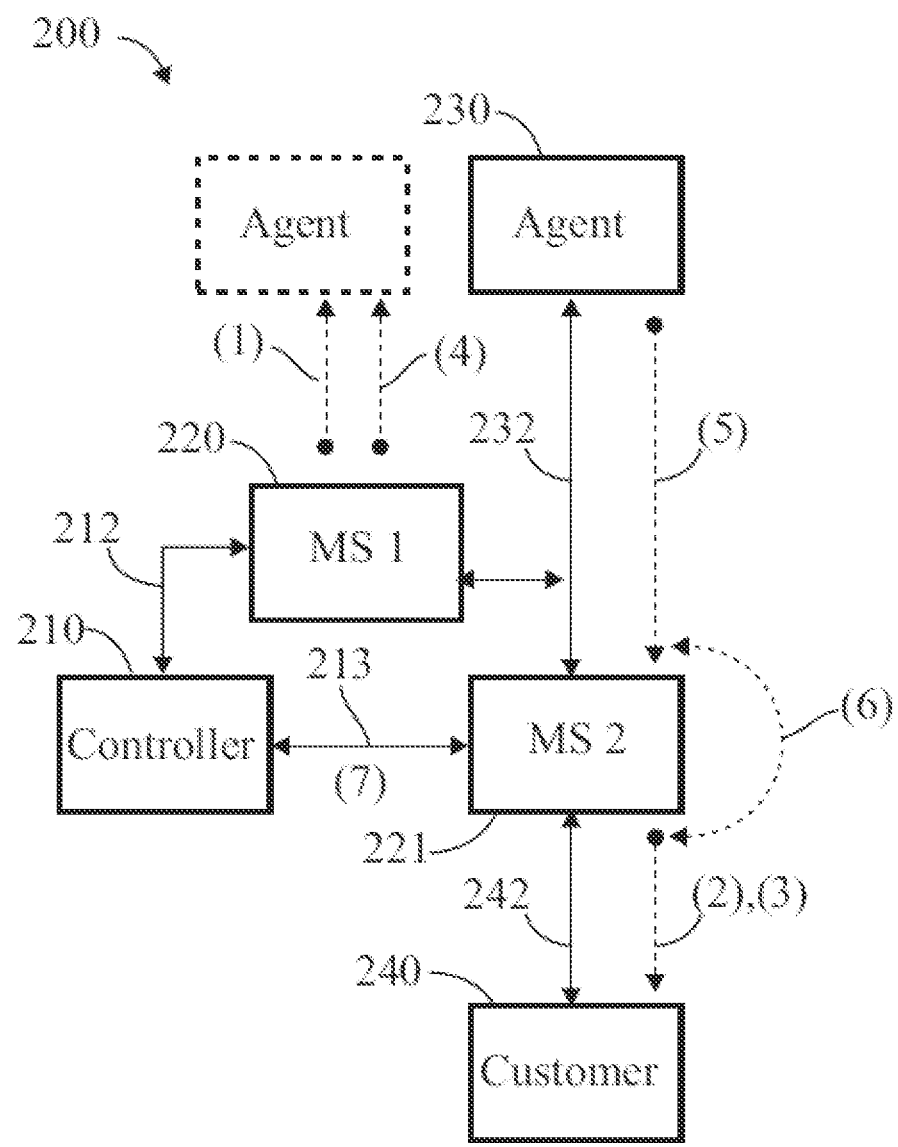
FIG. 2 is a diagram illustrating an exemplary embodiment of a multi-node predictive dialing system.

REFERENCE NUMERALS USED IN THE DRAWINGS 100 a single-node system
110 controller
112 line between controller 110 and media server 120
120 media server (node)
130 agent
132 call leg between media server 120 and agent 130
140 customer
142 call leg between media server 120 and customer 140
in FIG. 1, (1), (2), (3), (4), (5) are exemplary steps in a use scenario
200 a multi-node system
210 controller
212
213
220 media server MS1
221 media server MS2
230 agent
232 call leg between media server MS1 and agent 230
240 customer
242 call leg between media server MS1 and customer
in FIG. 2, (1), (2), (3), (4), (5), (6), (7) are exemplary steps in a use scenario

DETAILED DESCRIPTION

Various embodiments may be described to illustrate teachings of the invention(s), and should be construed as illustrative rather than limiting. It should be understood that it is not intended to limit the invention(s) to these particular embodiments. It should be understood that some individual features of various embodiments may be combined in different ways than shown, with one another.

The embodiments and aspects thereof may be described and illustrated in conjunction with systems, devices and methods which are meant to be exemplary and illustrative, not limiting in scope. Specific configurations and details may be set forth in order to provide an understanding of the invention(s). However, it should be apparent to one skilled in the art that the invention(s) may be practiced without some of the specific details being presented herein. Furthermore, some well-known steps or components may be described only generally, or even omitted, for the sake of illustrative clarity.

Reference herein to "one embodiment", "an embodiment", or similar formulations, may mean that a particular feature, structure, operation, or characteristic described in connection with the embodiment, is included in at least one embodiment of the present invention. Thus, the appearances of such phrases or formulations herein are not necessarily all referring to the same embodiment. Furthermore, various particular features, structures, operations, or characteristics may be combined in any suitable manner in one or more embodiments.

In the following descriptions, some specific details may be set forth in order to provide an understanding of the invention(s) disclosed herein. It should be apparent to those skilled in the art that these inventions(s) may be practiced without these specific details. Headings (typically underlined) may be provided as an aid to the reader, and should not be construed as limiting. Any dimensions and materials or processes set forth herein should be considered to be approximate and exemplary, unless otherwise indicated.

Embodiments of the invention will be described in the exemplary context of an outbound calling system having two media server nodes (MS1, MS2) as exemplary of a system architecture which is scalable and which may comprise two or more media server nodes (MS1, MS2 ... MSn), all operating under the direction of one or more controllers.

Generally, each of the media server nodes in the system is capable of dialing (calling) the phone number of an entity (referred to herein as a "customer") and, when the call is answered, connecting (or conferencing) the call with an available entity (referred to herein as "agent"). Operation of the media server nodes may be under Session Initiation Protocol (SIP), incorporated by reference herein.

The term "call leg" may be used to refer to the connection of a media server (MSx) with a customer. The term "nail up", and variations thereof, may be used to refer to the registration of an agent with a given media server. The agents in a call center may each have phones and terminals for displaying information (referred to herein as a "screen pop") sent by the system to the agent about a customer being called or who has answered a call.

The system may operate with predictive dialing capability. When a call is answered by a customer, it is important that the customer call leg be quickly routed to an available agent, establishing an agent call leg and connecting (conferencing) the customer with the agent.

Statistical analysis may be used by the system to anticipate the availability of an agent, or available agents may be selected from a queue. In either case, in order to minimize the occurrence of abandoned calls (a customer who has answered a call is not connected quickly with an agent, and hangs up), is important that the system be able to utilize its resources effectively to connect (conference) available agents as quickly as possible with customer call legs.

An outbound calling system having multiple media nodes may operate as follows:
1. establish agent nailups using media server nodes MS1 and MS2
   a. optionally, implement "load balancing" (distributing the total agent nailups substantially equally between the media server nodes)
2. start dialing customers using media server nodes MS1 and MS2
   a. optionally, implement "load balancing" (distributing the customer calls substantially equally between the media server nodes)
3. each media server (MS1, MS2) performs call analysis (determining whether or not a call is answered by a customer, and if answered is considered to be a "positive result")
4. for a positive result (the call is answered by a customer):
   a. the media server which called the customer (which is only one of the two or more media servers in the system, for example MS2) informs the controller that the customer answered the call
   b. the controller finds an available agent (determines which agent is available to be connected with the customer, such as from a hierarchical queue of available agents)
   c. if the agent nailup and the customer call are in the same node (such as MS2),
      i. instruct the corresponding media server to conference both calls (call legs) together
   d. if the agent nailup and the customer call are in different nodes (such as the agent nailup is in the node MS1 and the customer call leg is in the node MS2), the following steps may be performed in conjunction with moving the agent nailup to the customer call node (MS2),
      i. instruct the nailup node (MS1) to move the call (move the nailup) to the customer call node (MS2). This may be accomplished by the controller sending a "REFER" command to the agent's phone (or other communication terminal device). The REFER command may have the syntax "Refer-To=<ReservedNumber><Unique PIN>" where "Reserved Number" refers to a string chosen by an administrator for this purpose. This string must not be a prefix for an endpoint identifier in the system, like a local phone number and "Unique PIN" is a generated string that is guaranteed to be different than any other string generated for this purpose.
      ii. upon receiving the "REFER" command, the agent's phone may call, such as by sending an "INVITE" command to the customer call node (MS2), with a request URI (Uniform Resource Identifier) that includes "<ReservedNumber><Unique PIN>"
      iii. whereupon, the controller recognizes the incoming call from the agent on the customer call node MS2, using the <ReservedNumber> as a nailup movement, and looks up <Unique PIN> to identify the agent that the nailup belongs to.
      iv. the controller then may instruct the node MS2 to connect the customer call leg in conference with the just moved (i) agent nailup.

The steps described immediately hereinabove may be performed very quickly, such as within the 2 second constraint established in some jurisdictions for handling an answered call. And in conjunction with making the connection between agent and customer, the controller may send a screen pop to the agent's screen with information about the customer's call, to better enable the agent to service the customer.

FIG. 2 illustrates an exemplary multiple-node, predictive dialing system 200 comprising a controller 210 and two media servers (MS1, MS2) 220 and 221. The controller 210 directs the actions of the media servers 220 and 221 such as by sending commands (such as SIP commands) to the media servers 220 and 221, and the media servers 220 and 221 may send responses (such as status messages) back to the controller 210, as indicated by the lines 212 and 213, respectively. The media servers 220 and 221 constitute nodes in the system 200, and each may be referred to as a "media server node", or simply as a "node".

An agent 230 who may be one of many agents using the system 200 (such as in a call center) is shown. A customer 240 who may be one of many customers who are called (dialed) by the system 200 is shown. The controller 210 may direct (command) the media servers 220 and 221 to call a plurality of customers 240 using a predictive dialing scheme. The agent(s) 230 and customer(s) 240 are, of course, not part of the system 200, but they interact with the system 200.

The media servers 220 and 221 may establish nailups with agents. The load of agents nailed up with each of the media servers may be balanced (distributed substantially evenly among the media servers). The controller 210 is aware of which agents are nailed up with each of the media servers, maintaining a list thereof which may be organized hierarchically according to various criteria, such as which agents are currently available, which agents are likely to soon become available, or any other criteria associated with each of the agents.

In this example, an agent 230 who will be connected with a customer 240 answering a call is nailed up (logged into the system) with the media server 220 (MS1), and is shown in a dashed-line box.

Under direction of the controller 210, the media servers 220 (MS1) and 221 (MS2) dial customers. When a customer answers, a customer call leg may be established, as indicated by the line 242, between the answering customer and the media server (in this example, MS2) which called the customer.

In an exemplary use scenario, the media servers 220 and 221 (and controller 210) may perform the following steps (shown by dashed lines):

(1) the media server (MS1) 220 establishes a nailup with an agent (the agent is shown in a dashed-line box);
(2) the media server (MS2) 221 dials a customer 240 (this establishes a call leg, 242):
(3) the media server (MS2) analyzes the result of the call (whether or not the call is answered by the customer 240);

Since the customer call is in the media server 221 (MS2), and the agent nailup is in the media server 220 (MS1), the following steps may be performed in order to connect the agent 230 and the customer 240 in a conference.

(4) the controller 210 sends a command to the media server (MS1) 220 to initiate a nailup transfer. This may be accomplished by the controller 210 sending the command SIP command "REFER to MS2" to the agent 230 (shown in dashed-line box) to the media server MS1 220.
(5) the agent nailup is transferred from the media server MS1 220 to the media server MS2 221
(6) the agent 230 and the customer 240 are connected, via media server MS2 221 in a conference; and (7) the controller 310 may send a "screen pop" to the agent's screen, via the media server (MS2) 221, with information (such as name, personal profile, demographic information, and the like) about the customer 240 with whom the agent 230 is connected.

In this manner, the system 200 may be expanded to have more than two media servers (MS1, MS2 . . . MSn), so that limitations in the total number of call legs that can be handled by a single media server can be overcome in an efficient and scalable manner.

While the invention(s) has/have been described with respect to a limited number of embodiments, these should not be construed as limitations on the scope of the invention(s), but rather as examples of some of the embodiments. Those skilled in the art may envision other possible variations, modifications, and implementations that are also within the scope of the invention(s), based on the disclosure(s) set forth herein. Thus, while certain exemplary embodiments of a communication device, communication system, and methods of making and using the same have been shown and described above, it is to be distinctly understood that the invention is not limited thereto but may be otherwise variously embodied and practiced within the scope of the following claims.

What is claimed is:

1. A method of operating an outbound calling system, comprising:
    with each of at least two media servers, establishing a plurality of nailups with agents, and placing a plurality of calls to customers;
    for a given call to a customer which is answered, finding an available agent; and
    after finding the available agent:
        with the first media server, connecting the given call with the available agent when the nailup for the available agent and the given call are both in a first media server of the media servers; and
        moving the nailup for the available agent from the first media server to a second media server of the media servers when the nailup for the available agent is in the first media server and the given call to the customer is in the second media server, and, with the second media server, connecting the given call with the available agent after moving the nailup for the available agent from the first media server to the second media server.

2. The method of claim 1, further comprising:
    for a given call which is connected with the available agent, sending information about the customer to the agent.

3. The method of claim 1, wherein moving the nailup comprises:
    instructing the first media server to move the call to the second media server by sending a REFER command, via the first media server, to the available agent's phone with the instruction Refer-To=<ReservedNumber><Unique PIN>.

4. The method of claim 3, further comprising:
    the available agent's phone sending an INVITE command to the second media server with a request uniform resource identifier (URI) that includes <ReservedNumber><Unique PIN>.

5. The method of claim 4, further comprising:
    recognizing the incoming call from the available agent on the second media server, using the <ReservedNumber> as a nailup movement, and looking to the <Unique PIN> to identify the agent that the nailup belongs to.

6. The method of claim 1, further comprising:
balancing a load of agents nailed up with each of the media servers.

7. The method of claim 1, further comprising:
balancing a load of calls being dialed by each of the media servers.

8. The method of claim 1, wherein:
the media servers use predictive dialing to place the calls to the customers.

9. The method of claim 1, further comprising:
abandoning a call when that a call is not answered.

10. A non-transitory computer program product, the computer program product having a program configured to cause the outbound calling system to execute the method of claim 1 when run by the outbound calling system.

11. The product of claim 10, wherein the computer program product is a non-transitory machine readable medium having the program stored thereon.

12. An outbound calling system comprising:
a controller;
at least two media servers communicatively connected to the controller to receive commands from the controller, each of the media servers configured to handle call legs with customers and nailups with agents;
wherein:
each of the at least two media servers is configured to form nailups with at least some of the agents;
each of the at least two media servers is configured to dial customers;
each of the at least two media servers is configured to analyze call results;
the controller is configured to cause an agent nailup for an available agent to move from a first media server of the media servers to a second media server of the media servers when a customer call leg is in the second media server and an identified available agent of an agent nailup is in the first media server to connect the available agent with the customer of that customer call leg via the second media server.

13. The system of claim 12, wherein the call legs the media servers are configured to handle are legs of telephone call connections.

14. The system of claim 12, wherein the connection of the available agent with the customer connects a telephone of the available agent to a telephone of the customer.

15. The system of claim 12, wherein the controller is configured to cause the agent nailup for the available agent to move from the first media server to the second media server by sending a REFER command to a telephone of the available agent, the REFER command having an instruction type of Refer-To=<ReserveredNumber><Unique PIN>.

16. The system of claim 15, wherein the telephone of the available agent is configured to send an INVITE command to the second media server in response to receiving the REFER command, the INVITE command having a request uniform resource identifier that includes the <ReservedNumber><Unique PIN> of the REFER command.

17. The system of claim 16, wherein the controller recognizes an incoming call from the agent to the second media server via the INVITE command and is configured to use the <ReservedNumber> of the INVITE command to identify a nailup movement and utilize the <Unique PIN> to identify the available agent to which the nailup movement belongs to for instructing the second media server to connect the customer to the available agent.

18. The system of claim 17, wherein the controller is configured to send information to a screen associated with the available agent via the second media server with information about the customer.

19. The system of claim 17, wherein the first and second media servers are nodes of the outbound calling system.

20. The system of claim 17, wherein the connection of the available agent with the customer connects a telephone of the available agent to a telephone of the customer.

* * * * *